United States Patent
Koizumi et al.

[11] Patent Number: 6,111,608
[45] Date of Patent: Aug. 29, 2000

[54] ELECTRONIC CAMERA EQUIPPED WITH LOW-PASS FILTER AND LENS SYSTEM HAVING RESOLVING POWER

[75] Inventors: Yukinori Koizumi; Nobuyoshi Mori, both of Hachioji, Japan

[73] Assignee: Konica Corporation, Japan

[21] Appl. No.: 08/974,218

[22] Filed: Nov. 19, 1997

[30] Foreign Application Priority Data

Nov. 19, 1996 [JP] Japan .................................. 8-308274

[51] Int. Cl.⁷ .......................... H04N 5/225; G02B 13/16
[52] U.S. Cl. ........................................ 348/342; 348/335
[58] Field of Search .................................. 348/342, 335, 348/340, 344, 362

[56] References Cited

U.S. PATENT DOCUMENTS

| | | | |
|---|---|---|---|
| 4,998,800 | 3/1991 | Nishida et al. | 348/342 |
| 5,471,343 | 11/1995 | Takasugi | 348/342 |
| 5,568,197 | 10/1996 | Hamano | 348/342 |
| 5,940,127 | 8/1999 | Nakajima | 348/342 |
| 5,995,279 | 11/1999 | Ogino et al. | 348/342 |

*Primary Examiner*—Wendy Garber
*Assistant Examiner*—Luong Nguyen
*Attorney, Agent, or Firm*—Jordan B. Bierman; Bierman, Muserlian and Lucas

[57] ABSTRACT

An electronic still camera comprises solid-state image pickup elements arranged such that a pixel pitch is P (mm); an optical low-pass filter; an image pickup lens for focusing the image light through the optical low-pass filter onto the solid-state image pickup elements, the image pickup lens having resolving power X (lines/mm) at an optical axis when the image light is focused on the solid-state image pickup elements; wherein the following condition is satisfied:

$$1/F\lambda > X > 1/P$$

wherein F represents F-number and $\lambda$ is $550 \times 10^{-6}$ (mm).

4 Claims, 11 Drawing Sheets

SPATIAL FREQUENCY (lines/mm)

ELECTRONIC CAMERA EQUIPPED WITH LOW-PASS FILTER AND LENS SYSTEM HAVING RESOLVING POWER

BACKGROUND OF THE INVENTION

The present invention relates to an electronic still camera, and more particularly, to an electronic still camera wherein an image obtained through an image pickup lens is received by a solid-state image pickup element so that a still image is handled as digital data.

An electronic still camera is structured so that an image obtained through an image pickup lens is subjected to photoelectric transfer in a solid-state image pickup element, and image signals thus obtained are handled as digital data.

In the case of a camera employing a solid-state image pickup element (a still camera handling a still image and a video camera handling a moving image), it has so far been known, when a resolving power is high to be at a certain level or higher and a subject is a cyclic one such as a net pattern, that an interference is caused by the cyclic relation of intervals of photosensors of the solid-state image pickup element, and a false image is generated.

There have been utilized double refraction characteristics of an optical low-pass filter made of crystal plate to double an image and thereby to cut high frequency components by lowering the resolving power of the image pickup lens to prevent occurrence of the problem of the false image mentioned above.

(1) First problem

However, there has recently been an increasing demand for higher image quality, and it has been found that an image obtained by using a conventional optical low-pass filter alone can not satisfy the demanded image quality sufficiently.

On the point of high image quality, in particular, it has been demanded to make an image of an electronic camera to be close to that of silver halide photography, and there are demands not only for resolving power but also for image sharpness and contrast (definition).

(2) Second problem (1) In photoelectric conversion characteristics of a solid-state image pickup element, a change in output for a change in input is greater than in the case of gamma characteristic of a silver halide film.

(2) Even when the same quantity of light arrives at a photosensor portion of a solid-state image pickup element, the rate of photoelectric conversion varies depending on an incident angle.

Figure 11:
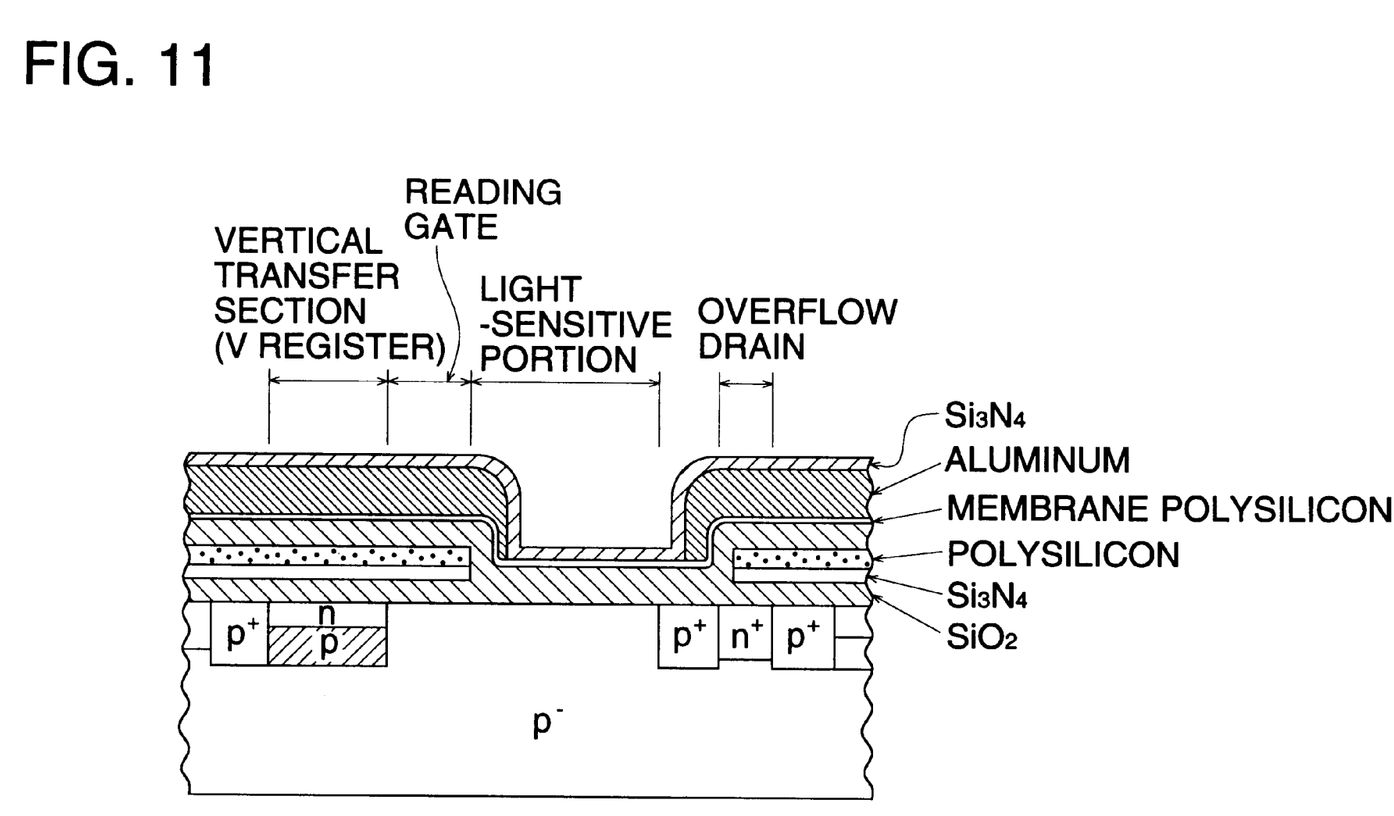
FIG. 11 is a sectional view showing a section in the horizontal direction of a pixel of a solid-state image pickup element.

(3) FIG. 11 shows a section in the horizontal direction of a pixel, and eclipse is caused on the peripheral portion of a solid-state image pickup element depending on an incident angle, by an uneven surface on the peripheral portion of a photosensor (light-receiving portion) of the solid-state image pickup element such as that shown in FIG. 11. For a certain incident angle, therefore, light arrives at a photosensor portion located at a recessed portion, and the rate of photoelectric conversion is lowered. An influence of this phenomenon is greater on the peripheral portion of the solid-state image pickup element.

SUMMARY OF THE INVENTION

Inventors of the invention found the problem specific to an electronic still camera that a quantity of light on the peripheral portion is more lowered by (1)–(3) phenomena stated above than in a camera employing a silver halide film.

The first object of the invention, therefore, is to realize an electronic still camera wherein sufficient sharpness and definition can be obtained even when an optical low-pass filter is used.

The second object of the invention is to realize an electronic still camera wherein brightness of the edge of image field is less lowered and brightness in an image plane is even.

(1) As a result of intensive study for the first object stated above, it was found that, when there exists a specific relation between a pixel pitch of solid-state image pickup element and resolving power of an image pickup lens, sufficient sharpness and definition can be obtained even when an optical low-pass filter is used.

The invention is represented by an electronic still camera composed of an image pickup lens, an optical low-pass filter and a solid-state image pickup element, wherein resolving power X (lines/mm) of the image pickup lens at the center of a light-receiving surface of the solid-state image pickup element satisfies the condition of $$1/F\lambda > X > 1/P$$

wherein, P represents a pixel pitch (mm) of the solid-state image pickup element, F represents an F-number and $\lambda$ is $550 \times 10^{-6}$ (mm).

In the camera of this type, resolving power X of the image pickup lens at the center of a light-receiving surface of the solid-state image pickup element is established to be not less than twice the limiting resolving power (1/(2P)) which is determined by the pixel pitch of the solid-state image pickup element. Therefore, even when an optical low-pass filter is used, it is possible to obtain an image which has sufficient sharpness and definition in the vicinity of the limit resolving power.

It is therefore possible to realize an electronic still camera wherein sufficient sharpness and definition can be obtained even when an optical low-pass filter is used.

Incidentally, the center of a light-receiving surface of the solid-state image pickup element means a position of an intersecting point where two diagonal lines of the solid-state image pickup element cross each other.

Further, the invention is represented by an electronic still camera wherein resolving power Y (lines/mm) of the image pickup lens at the position being away from the center of a light-receiving surface of the solid-state image pickup element by 0.45 q satisfies the condition of $$Y > 1.3/2P$$

wherein, P represents the pixel pitch (mm) of the solid-state image pickup element.

In the camera of this type, resolving power Y of the image pickup lens at the periphery (0.45 q from the center) of a light-receiving surface of the solid-state image pickup element is established to be not less than 1.3 times the limit resolving power (1/(2P)) which is determined by the pixel pitch of the solid-state image pickup element. Therefore, even when an optical low-pass filter is used, it is possible to obtain sufficient MTF in the vicinity of the limit resolving power on the area covering from the center to the periphery of the light-receiving surface.

It is therefore possible to realize an electronic still camera wherein sufficient sharpness and definition can be obtained even when an optical low-pass filter is used.

The invention is further represented by an electronic still camera composed of an image pickup lens, an optical low-pass filter and a solid-state image pickup element, wherein the condition of $$h > 2.5q$$

is satisfied when q represents a length of a diagonal line of a light-receiving surface of the solid-state image pickup element and h represents a distance between emergence pupil of the image pickup lens and the solid-state image pickup element, and the condition of $$L2 \geq 0.5L1$$

is satisfied when L1 represents a quantity of light at the center of a light-receiving surface of the solid-state image pickup element and L2 represents a quantity of light at the position being away from the center of a light-receiving surface of the solid-state image pickup element.

In the camera of this type, a distance between an image pickup lens and a solid-state image pickup element is set so that a prescribed ratio may be obtained depending on the size of the solid-state image pickup element, and it is further determined so that a ratio of a quantity of light at the center of a light-receiving surface of the solid-state image pickup element to that at the periphery of the light-receiving surface of the solid-state image pickup element may be the prescribed one. Therefore, sufficient light-receiving signals can be obtained even on the periphery of the light-receiving surface.

Accordingly, it is possible to realize an electronic camera wherein brightness of the edge of image field falls less and brightness on an image plane is uniform.

DETAILED DESCRIPTION OF THE PREFERRED EMBODIMENT

An embodiment of the invention will be explained in detail as follows.

(Structure of an electronic still camera)

First, the structure of an electronic still camera used in the present embodiment will be explained, referring to FIG. 1.

Figure 1:
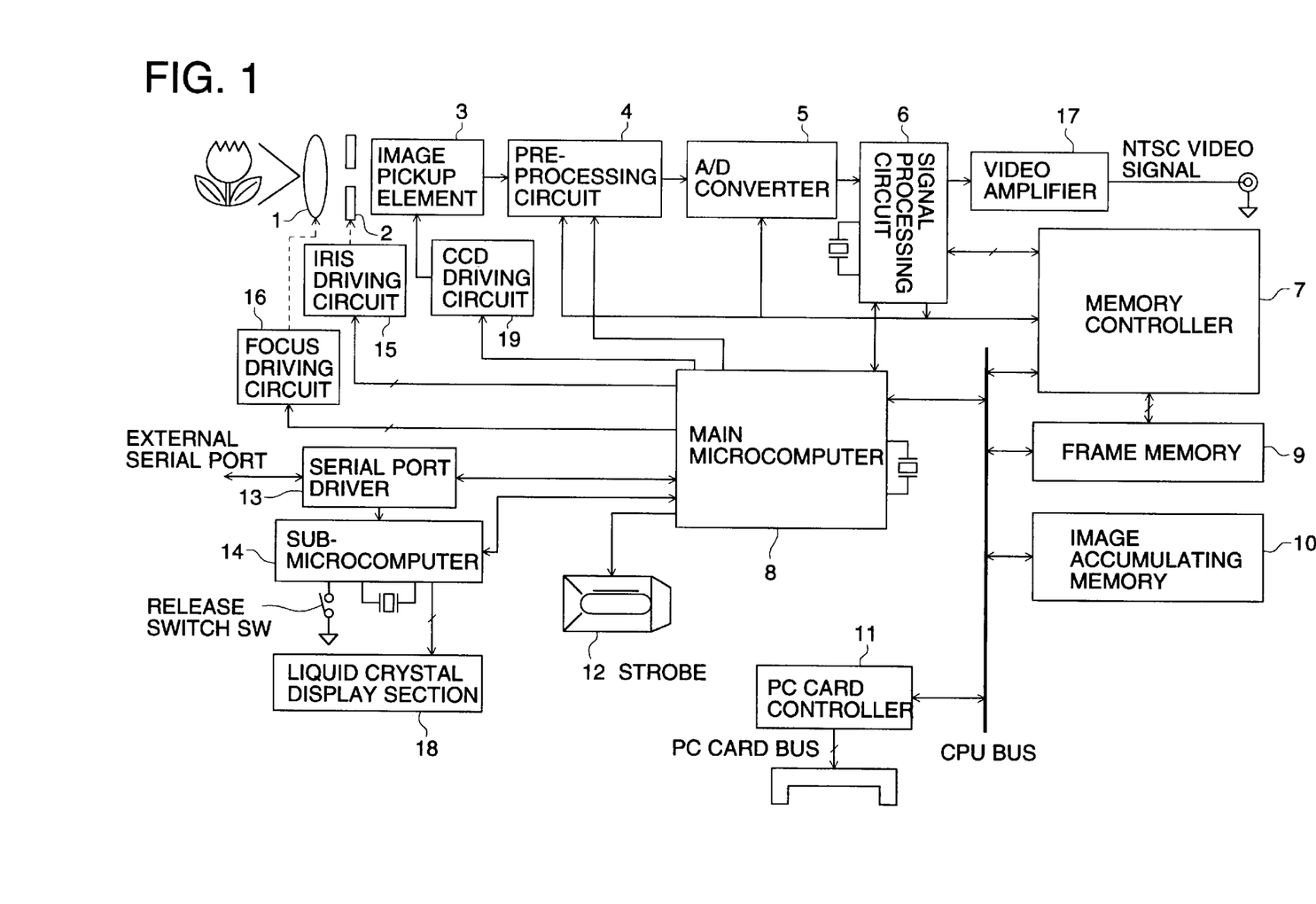
FIG. 1 is a function block diagram showing the structure of an electronic still camera used in the present embodiment of the invention.

FIG. 1 is a function block diagram showing the overall and electrical schematic structure of an electronic still camera in the present embodiment of the invention.

In the electronic still camera shown in FIG. 1, an optical image obtained through an optical system composed of lens 1, aperture-stop 2 and others is formed on a light-receiving surface of image pickup element 3 such as a CCD. In this case, lens 1 and aperture-stop 2 are driven respectively by focus driving circuit 16 and iris driving circuit 15.

The image pickup element 3 photoelectrically transfers the optical image formed on the light-receiving surface into a charge amount, and outputs analog image signals through transfer pulse from image pickup element driving circuit 19.

Noises in the analog image signals thus outputted are reduced through CDS (correlative double sampling) processing conducted in preprocessing circuit 4, then, gains are adjusted by AGC, and binary-coding processing for dynamic range extension is conducted.

Then, the analog image signals are converted by A/D converter 5 into digital image signals which are then subjected to brightness processing and color processing in signal processing circuit 6 to be converted into digital video signals (for example, brightness signals (Y) and color difference signals (Cr, Cb) which are further outputted to memory controller 7.

On the other hand, this signal processing circuit 6 is also equipped therein with a D/A converter, whereby, it can output colored image signals inputted from the A/D converter 5 and image data inputted reversely from the memory controller 7, as analog video signals.

Switching of these functions is conducted by data exchange with main microcomputer 8, and in case of need, it is also possible to output exposure information of image pickup element signals, focus signals, and white balance information to the main microcomputer 8.

This main microcomputer 8 mainly controls photographing, recording and reproducing, and when necessary, it conducts compression and reproduction of photographed images and serial port transmission with external equipment. In this case, CCITT and JPEG system standardized by ISO, or JBIG system are used for image compression.

In the memory controller 7, digital image data inputted from the signal processing circuit 6 are accumulated in frame memory 9, or, on the contrary, image data of the frame memory 9 are outputted to the signal processing circuit 6.

The frame memory 9 is an image memory having a capacity to accumulate image data on at least one image plane, and its example used generally includes VRAM, SRAM and DRAM, for example. In this case, however, VRAM capable of operating independently of CPU bus is used.

Image accumulating memory 10 is a memory that is built in the main body, and it accumulates the image data stored in the frame memory 9 and then subjected to image compression processing in the main microcomputer 8. As this image accumulating memory 10, SRAM, DRAM and EEPROM, for example, are used, and EEPROM is preferable when storage of image data in the memory is considered.

PC card controller (PCMCIA controller) 11 is one to connect the main microcomputer 8 with an external recording medium such as PC memory card (hereinafter referred to simply as PC card), whereby, images stored in the frame memory 9 are recorded in the external storage medium through this controller 11 after being subjected to image compression processing in the main microcomputer 8. As an external PC card for storage connected through the PC card controller 11, an SRAM card, a DRAM card and an EEPROM card can be used, and it is also possible to transfer image data directly to a storage medium at a remote location through public lines by the use of modem card or an ISDN card.

Strobe 12 is so arranged that its emission timing can be obtained by the main microcomputer 8 which controls the photographing sequence.

Serial port driver 13 conducts signal exchange for transmitting information between a camera main body and an external equipment. As a serial transmission means, there are recommended standards for serial communication such as an RS232C and an RS422A, and RS232C is used in this case.

Sub-microcomputer 14 controls man/machine interface such as operation switches and liquid crystal display of the camera main body, and conducts, when necessary, information transmission to the main microcomputer 8. In this case, a serial input/output terminal is used for information transmission with the main microcomputer 8. Further, a watch function is also built in, and automatic dating is also controlled.

Iris driving circuit 15 is composed of an auto-iris, for example, and is controlled by the main microcomputer 8 to change a stop value of optical iris 2.

Focus driving circuit 16 is composed of a stepping motor, for example, and is controlled by the main microcomputer 8 to change a lens position so that an optical focus plane of a subject may properly be positioned on image pickup element 3. The numeral 18 represents a liquid crystal display portion which is connected with sub-microcomputer 14 and displays various kinds of information such as photographing information.

Incidentally, in the structure shown in FIG. 1, image compression and image extension are conducted in the main microcomputer 8. However, an exclusive circuit for image compression/extension may be arranged on a CPU bus.

(Basic operations of an electronic still camera)

Next, a series of operations covering from photographing to memory recording will be explained. A mode for camera operations is established based on information of various switches connected with sub-microcomputer 14, and information for photographing is inputted in the main microcomputer 8 as serial information.

In accordance with this information, the main microcomputer 8 establishes memory controller 7 and serial port driver 13. When a release switch on sub-microcomputer 14 is pressed, the sub-microcomputer 14 learns that first switch signal S1 has become active, and issues an image input command to signal processing circuit 6 which causes image pickup element 3, preprocessing circuit 4 and A/D converter 5 to operate to receive image data.

The image data thus received are subjected to basic processing in the signal processing circuit 6, and then, focus information is prepared from high frequency components of brightness data, and exposure data are prepared from low frequency components. The main microcomputer 8 reads these data from the signal processing circuit 6, and conducts, when necessary, iris driving, focus driving, and further gain control of AGC amplifier of preprocessing circuit 4, so that appropriate exposure and focusing may be obtained. Further, depending on an operation mode, it is also possible to output analog image signals from the signal processing circuit 6 through video amplifier 17 as an NTSC video signal.

After exposure, when a signal showing that second release switch signal S2 has been pressed is inputted from the sub-microcomputer 14 into the main microcomputer 8 after focusing has been converged to an appropriate value, the main microcomputer 8 outputs a command for taking in data to memory controller 7. It further outputs, in case of need, an emission signal to strobe 12 at field timing of images to be taken in. The memory controller 7, when receives the command for taking in data, detects a synchronization signal from the signal processing circuit 6, and takes image data in forms of Y, Cr and Cb which are outputted from the signal processing circuit 6 into frame memory 9 at prescribed timing.

When taking images in frame memory 9 is completed, the memory controller 7 indicates a status showing that the taking in has been completed. When the status is read by the main microcomputer 8, it is learned that photographing has been completed with the main microcomputer 8. After completion of the photographing, the main microcomputer 8 conducts image compression, if necessary, and sends image data to image accumulating memory 10, IC card connected with external equipment, or a personal computer connected with an external serial port.

In the case of reproduction display operations, image data are read by the main microcomputer 8 from image accumulating memory 10, IC card connected to external equipment, or a personal computer connected with an external serial port, then image extension is conducted, in case of need, and image data are written in frame memory 9. After that, image data are read by the signal processing circuit 6 and memory controller 7, and analog signals of the image are outputted to an output terminal through the signal processing circuit 6. Thus, the function of the camera for photographing, recording, reproducing, displaying and sending are attained.

Next, operations for serial communication will be explained. Serial communication with external computers is possible through an external serial port which is driven by the serial port driver 13. The electronic still camera explained here operates, when connected with a computer, as a slave mode wherein input from the switch of the camera itself is prohibited and a command from the computer is accepted.

This is to prevent that a request made by the operation of a camera and a request made by the operation from a computer are different each other. The electronic still camera which is under the slave mode displays on its liquid crystal display section 18 that it is under the slave mode.

Incidentally, the electronic still camera which has received a command or data stores them in an EEPROM and sub-microcomputer. For example, date and time are stored in the sub-microcomputer which is in charge of watch functions, and operations can be realized in accordance with a mode of customized data transmitted even after the connection with a computer has been cut. Further, what is related to these data is also initially set in the electronic still camera in advance, and operations can be done even when data are not transferred by the computer. On the part of the electronic still camera, there are provided plural places (banks) where customized data are stored, whereby, it is also possible to change to the desired state easily.

Since the data established on the part of a computer can be preserved also on the part of the computer, establishment for the following occasion can also be conducted in the same manner.

Figure 2:
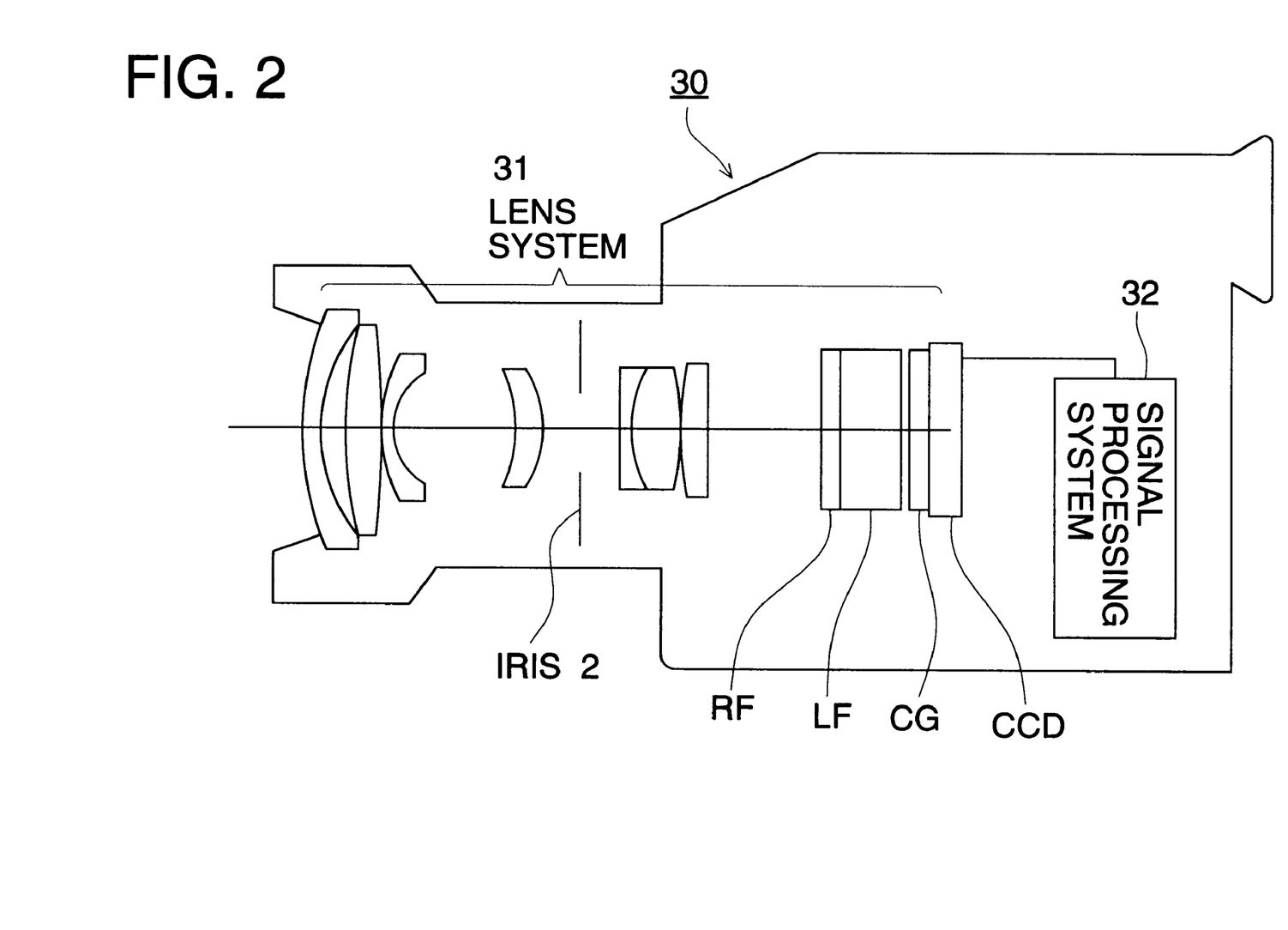
FIG. 2 is a lens layout diagram showing the optical and schematic structure of an electronic still camera used in the present embodiment of the invention.

FIG. 2 is a lens arrangement diagram showing the total optical and schematic structure of an electronic still camera in an embodiment of the invention.

In FIG. 2, electronic still camera 30 is composed of lens system 31 which has been explained as lens 1 in FIG. 1, solid-state image pickup element CCD, and signal processing system 32 including a signal processing circuit explained in FIG. 1.

Optical system 31 is structured so that light passes through 7 image pickup lenses, infrared blocking filter RF, optical low-pass filter LF and cover glass CG to form an image on the solid-state image pickup element CCD.

Optical low-pass filter cuts high spatial frequency component.

The solid-state image pickup element CCD used in the present embodiment is ICX084K (trade name) made by Sony Corp. which means that a CCD to be used is one for reading all pixels of about 330,000 having an aspect ratio of 4:3, light-receiving surface dimension of ⅓ inches, pixel pitch of a tetragonal lattice with 7.4 $\mu$m×7.4 $\mu$m and effective number of pixels of 659 H×494V.

Figure 3:
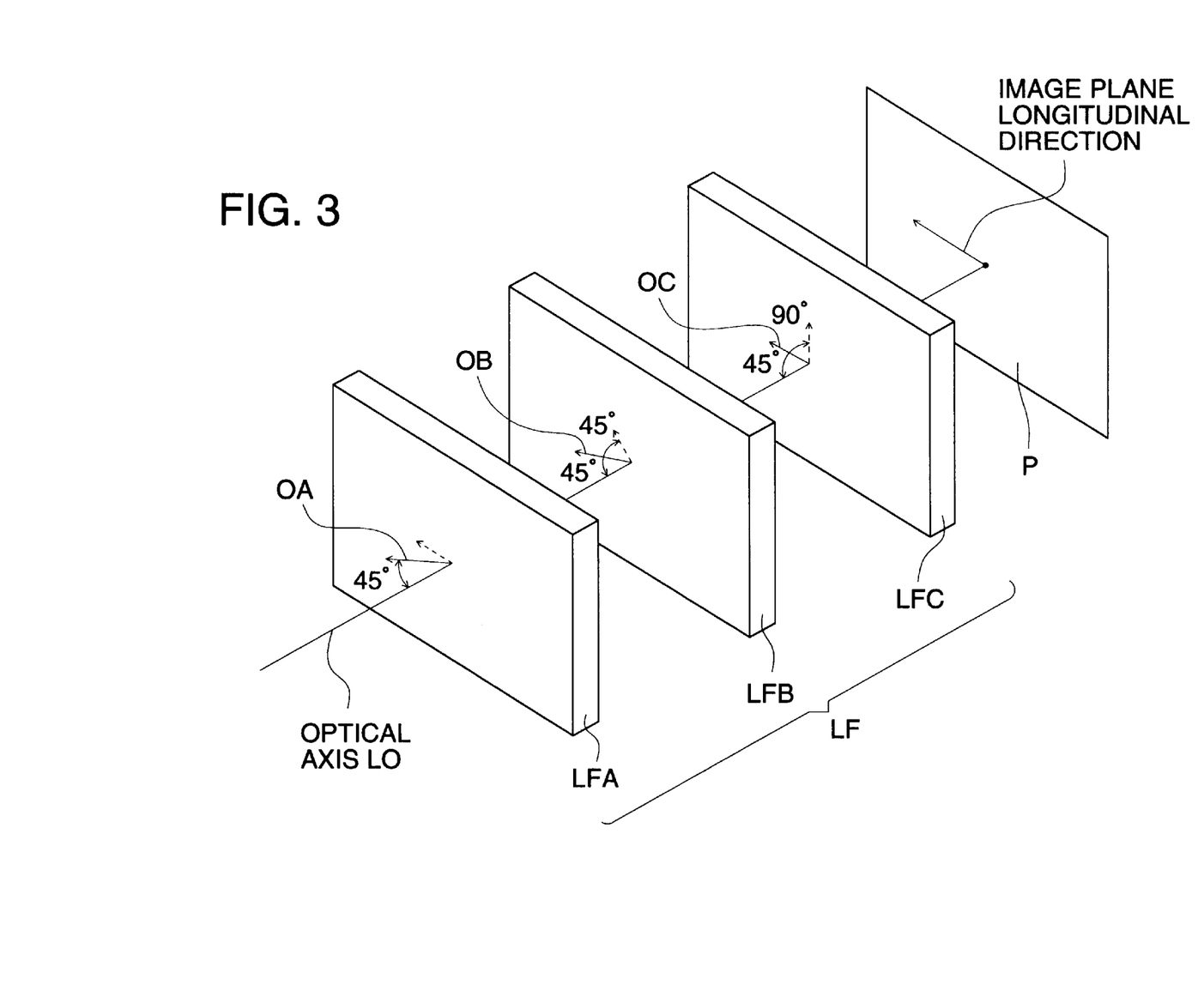
FIG. 3 is an exploded sketch of optical low-pass filter LF of an electronic still camera used in the present embodiment of the invention.

Optical low-pass filter LF is composed of three crystal plates LFA, LFB and LFC whose crystal axis are different from each other.

Namely, there are combined three crystal plates LFA, LFB and LFC whose optical axes OA, OB and OC are tilted by 45° from optical axis LO and they respectively form angles of 0°, 45° and 90° from the longitudinal direction when they are projected on a plane perpendicular to optical axis LO. Incidentally, thickness of each crystal plate is shown in Table 1 below.

TABLE 1

| Crystal plate | Thickness of each crystal plate (mm) |
|---|---|
| 0° | 1.22 |
| 45° | 0.87 |
| 90° | 1.22 |

In the present embodiment and examples as well as comparative examples shown below, f represents a focal length (mm), F is a stop value, Nd is the refractive index on line d, ν d is Abbe number on line d, P is a minimum value (mm) of distance (pixel pitch) between centers of neighboring photosensors in solid-state image pickup element CCD, h is a distance (mm) from an emergence pupil of an image pickup lens to solid-state image pickup element CCD, q is a length (mm) of a diagonal line of the solid-state image pickup element CCD, L1 is a quantity of light (cd) at the center position of a light-receiving surface of the solid-state image pickup element CCD, L2 is a quantity of light (cd) on the peripheral position (position being away from the center of a light-receiving surface by 0.45 q) of the solid-state image pickup element CCD, and X is resolving power (lines/mm) obtained through a projection method.

A projection method through which resolving power is obtained is a method wherein the resolving power is obtained by confirming black lines and white lines on a chart marginally when the chart is located at the position of CCD and light is projected on the chart from the part of a lens so that a transmission-type image of the chart is observed, and as characteristics thereof, the resolving power corresponds to the spatial frequency wherein MTF is 20%.

Figure 4:
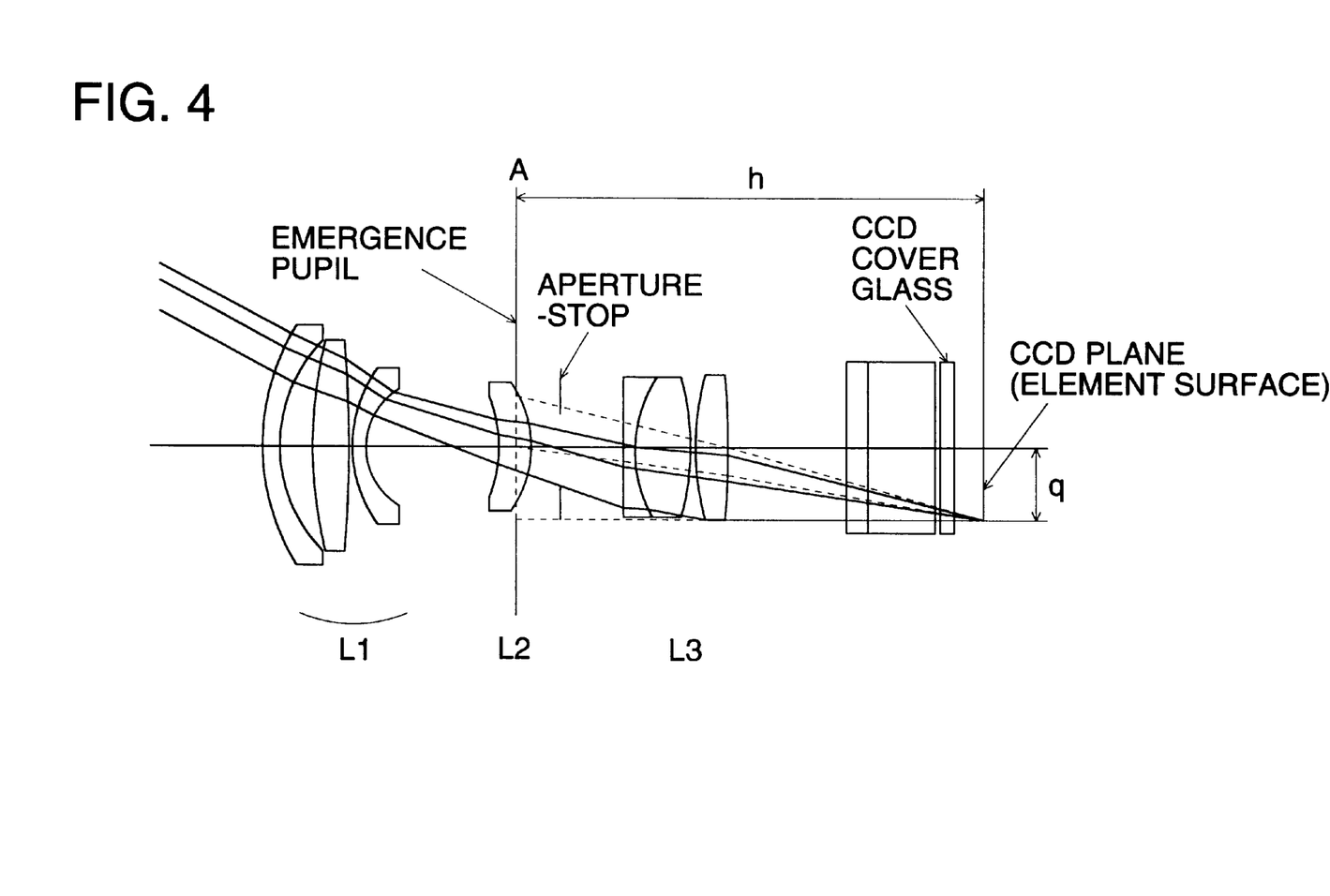
FIG. 4 is a sectional view of an optical system of emergence pupil of an image pickup lens used in the explanation of the present embodiment of the invention.

The emergence pupil mentioned above is an image of aperture-stop 2 which is formed by an image pickup lens located behind (on the part of a solid-state image pickup element) the aperture-stop 2. In accordance with an example shown in FIG. 4, the emergence pupil is an image formed by lens L3, and this image is formed at the position of A.

Concrete examples of an embodiment will be explained as follows.

An electronic still camera equipped with an optical low-pass filter as stated above is structured so that resolving power X (lines/mm) of lens system 31 at the center of a light-receiving surface of a solid-state image pickup element may satisfy the following condition, $$1/(F\lambda) > X > 1/P$$

wherein, P represents pixel pitch (mm) of the solid-state image pickup element, F represents an F-number, and λ is 550×10$^{-6}$ (mm).

In the electronic still camera structure as stated above, it is possible to obtain an image which has sufficient sharpness and definition in the vicinity of the limiting resolving power even when optical low-pass filter LF is used, because resolving power X of the image pickup lens at the center of a light-receiving surface of a solid-state image pickup element is set to be not less than twice the limiting resolving power (1/(2P)) which is determined by the pixel pitch of the solid-state image pickup element and by Nyquist theory.

Figure 5:
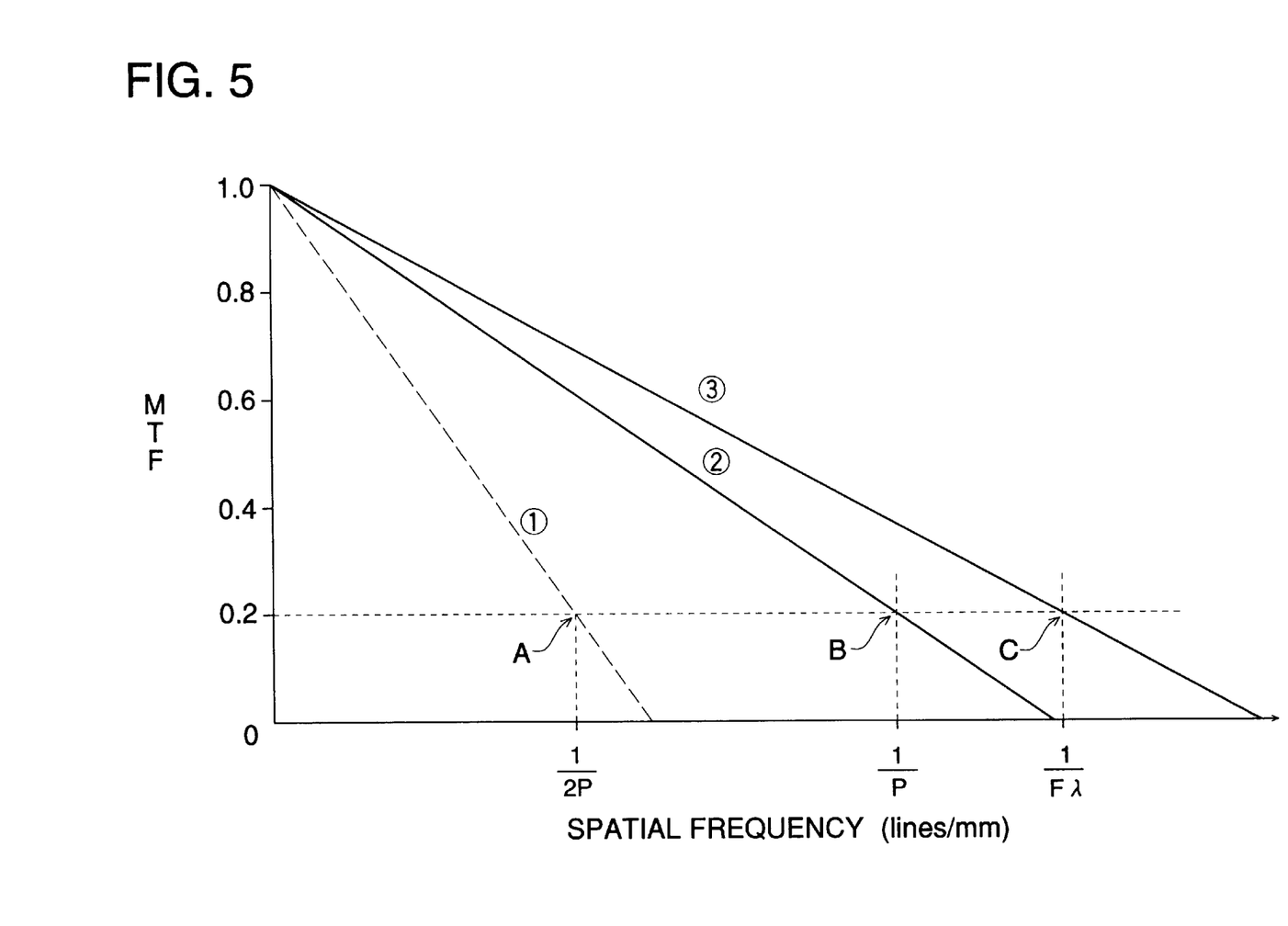
FIG. 5 is a characteristics diagram showing the relation between a spatial frequency of an image pickup lens used for an electronic still camera in the invention and MTF.

FIG. 5 is a characteristics diagram showing the relation between spatial frequency and MTF, and the spatial frequency with MTF=0.2 in FIG. 5 corresponds to resolving power (lines/mm) of the lens system. The resolving power which is not lower than the limiting resolving power (1/(2)) has been considered unnecessary because false signals are generated in that resolving power by the pixel pitch of the solid-state image pickup element, and a lens system close to the characteristics (1) in FIG. 5 has been structured. In this case, spatial frequency (U) at point A represents resolving power of the lens at that time, resulting in X=½P.

For the foregoing, the condition of X>1/P is introduced in the invention, resulting in the characteristics shown in FIG. 5. Namely, in this case, spatial frequency (U) at point B represents the resolving power of the lens, resulting in X=1/P. In the vicinity of the limiting resolving power (1/(2P)), MTF is sufficiently high.

Accordingly, it is possible to realize an electronic still camera wherein an image having sufficient sharpness and definition can be obtained even when an optical low-pass filter is used to eliminate spatial frequency component which is not lower than the limiting resolving power.

MTF and spatial frequency ν in an ideal lens can be expressed by the following expression.

$$MTF(\lambda Fv) = 1/\pi[2\cos^{-1}(\lambda Fv) - \sin\{2\cos^{-1}(\lambda Fv)\}]$$

A straight line approximated to the above expression is described as (3) in FIG. 5. Since resolving power of the lens X can not exceed the intersecting point where the straight line (3) and MTF=0.2 intersect each other, it suffers restriction of "1/(Fλ)>X". Here, F represents an F-number, and λ is determined to be 550 nm which is a representative value in a visible radiation range.

From the foregoing, resolving power X needs to be within the following range.

$$1/(F\lambda) > X > 1/P$$

An electronic still camera equipped with an optical low-pass filter as stated above is structured so that resolving power X (lines/mm) of lens system 31 at the center of a light-receiving surface of a solid-state image pickup element may satisfy the following condition, $$1/(F\lambda) > X > 1/P$$

wherein, P represents pixel pitch (mm) of the solid-state image pickup element, F represents an F-number, and λ is 550×10⁻⁶ (mm), and so that resolving power Y (lines/mm) of the above-mentioned image pickup lens at the position being away from the center of a light-receiving surface of the solid-state image pickup element may satisfy the following condition.

$$Y > 1.3/(2P)$$

In the electronic still camera structure as stated above, it is possible to obtain sufficient MTF in the vicinity of the limiting resolving power even when an optical low-pass filter is used, because resolving power X of the image pickup lens at the center of a light-receiving surface of a solid-state image pickup element is set to be not less than twice the limiting resolving power (1/(2P)) which is determined by the pixel pitch of the solid-state image pickup element and by Nyquist theory, and resolving power X of the image pickup lens at the peripheral portion (position being away from the center by 0.45 q) of a light-receiving surface of the solid-state image pickup element is set to be 1.3 times or more the limiting resolving power (1/(2P)).

Figure 6:
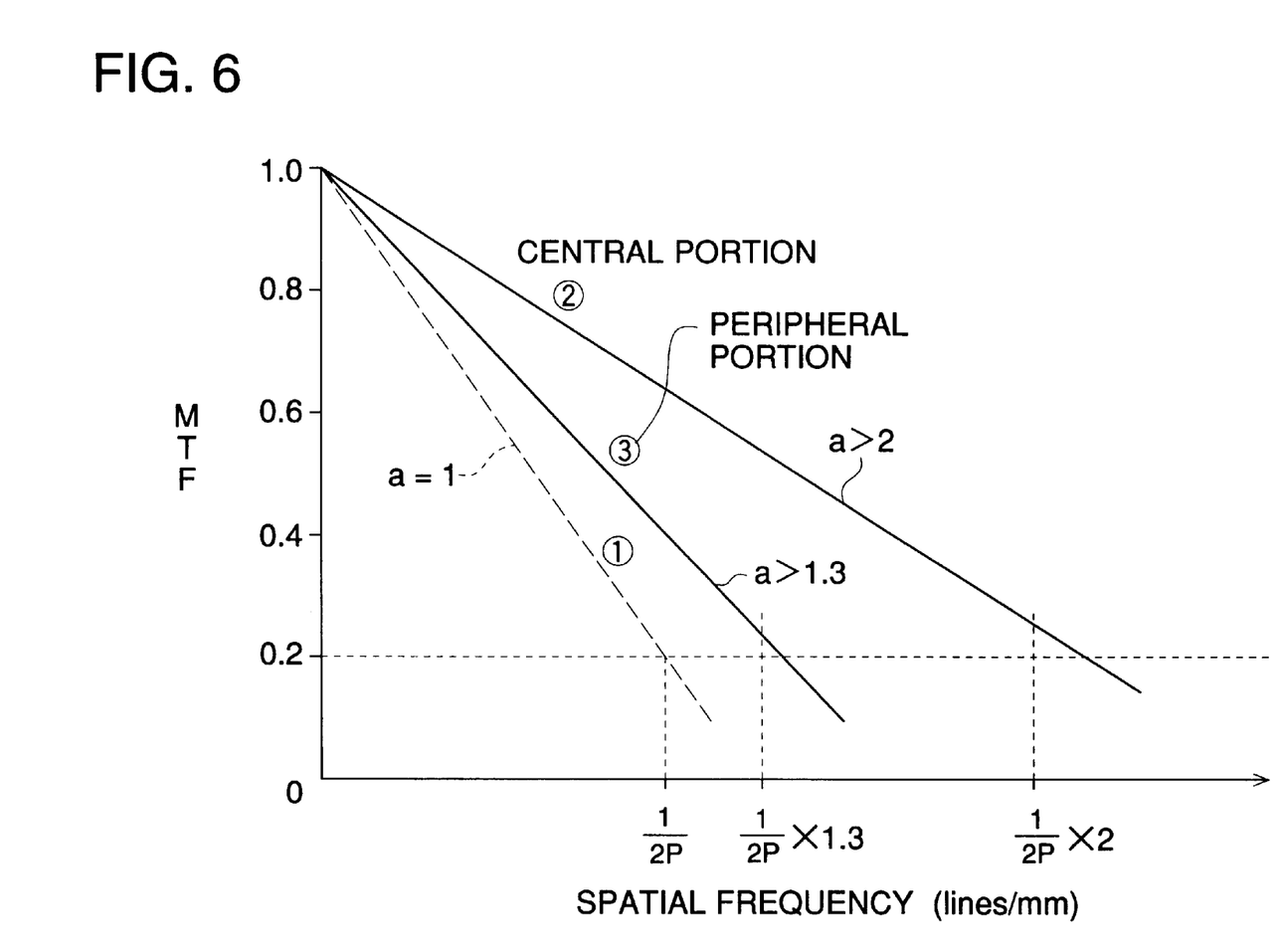
FIG. 6 is a characteristics diagram showing the relation between a spatial frequency of an image pickup lens used for an electronic still camera in the invention and MTF.

FIG. 6 is a characteristics diagram showing the relation between spatial frequency and MTF, and the spatial frequency with MTF=0.2 in FIG. 6 corresponds to resolving power (lines/mm) of the lens system. The resolving power which is not lower than the limiting resolving power (1/(2)) has been considered unnecessary because false signals are generated in that resolving power by the pixel pitch of the solid-state image pickup element, and a lens system close to the characteristics (1) in FIG. 6 has been structured.

For the foregoing, the condition of X>1/P at the center of a light-receiving surface of the solid-state image pickup element is introduced in the invention, resulting in the resolving power that is twice or more the limiting resolving power and the characteristics (2) shown in FIG. 6. In this case, MTF is sufficiently high in the vicinity of the limiting resolving power (1/(2P)).

At the peripheral portion of a light-receiving surface of the solid-state image pickup element, the resolving power is made to be not less than 1.3 times the limiting resolving power with a >1.3, therefore, MTF is high in the vicinity of the limiting resolving power (1/(2P)) even in the peripheral portion as shown line (3) in FIG. 6.

Accordingly, it is possible to realize an electronic still camera wherein an image having sufficient sharpness and definition from the center of a light-receiving surface of the solid-state image pickup element to the peripheral portion can be obtained even when an optical low-pass filter is used to eliminate spatial frequency component which is not lower than the limiting resolving power.

Figure 7:
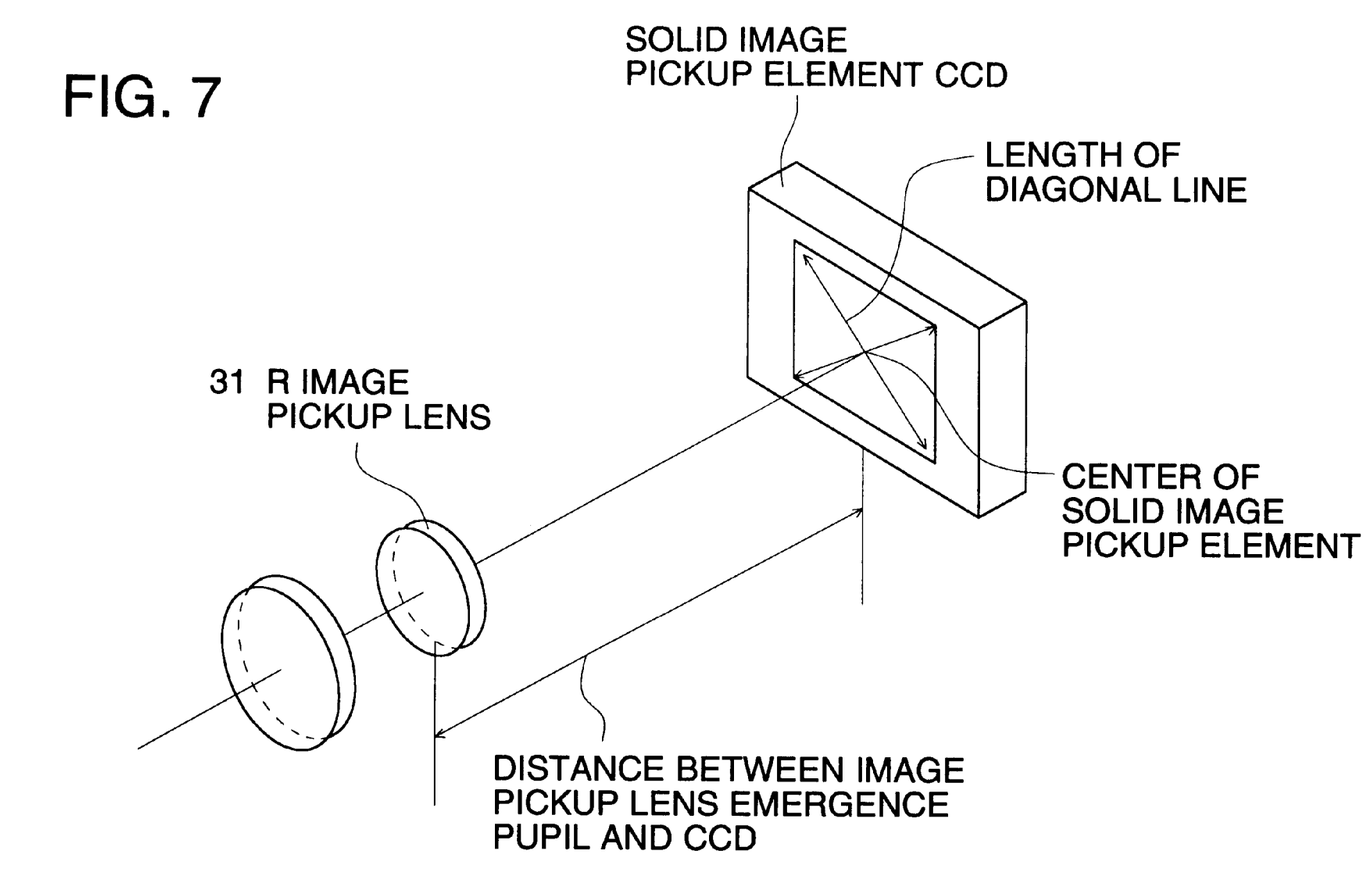
FIG. 7 is a diagram showing the relation between diagonal line length q on a light-receiving surface of solid-state image pickup element CCD in an electronic still camera of the invention and distance h between emergence pupil of an image pickup lens and a light-receiving surface of the solid-state image pickup element CCD.

Further, as stated above, the electronic still camera having therein an image pickup lens, an optical low-pass filter and a solid-state image pickup element is structured so that the following condition may be satisfied when q represents a length of a diagonal line of a light-receiving surface of solid-state image pickup element CCD, and h represents a distance between an emergence pupil of image pickup lens 31R and the light-receiving surface (element surface) of the solid-state image pickup element CCD as shown in FIG. 7.

$$h > 2.5q$$

Incidentally, in FIG. 7, optical low-pass filter LF and infrared blocking filter RF are omitted.

The electronic still camera is further structured so that the following condition may be satisfied, when L1 represents a quantity of light at the center of a light-receiving surface of the solid-state image pickup element and L2 represents a quantity of light at the position being away from the center of a light-receiving surface of the solid-state image pickup element by 0.45 q.

$$L2 \geq 0.5L1$$

(1) In this electronic still camera, a distance between the image pickup lens and the solid-state image pickup element is set to be increased depending on the size (length q of a diagonal line) of the solid-state image pickup element so that a ratio greater than a prescribed ratio may be obtained, whereby it is possible to keep the incident angle small even for the peripheral portion. Owing to this, it is possible to lessen an effect of eclipse which tends to be caused at the peripheral portion depending on the incident angle, even in the case of a solid-state image pickup element having roughness shown in FIG. 11.

(2) Further, since the image pickup lens is set to have the characteristic that a quantity of light at the center and that at the peripheral portion both of a light-receiving surface of a solid-state image pickup element generate a prescribed ratio, sufficient light-receiving signals can be obtained even on the peripheral portion of the light-receiving surface.

Figure 8A:
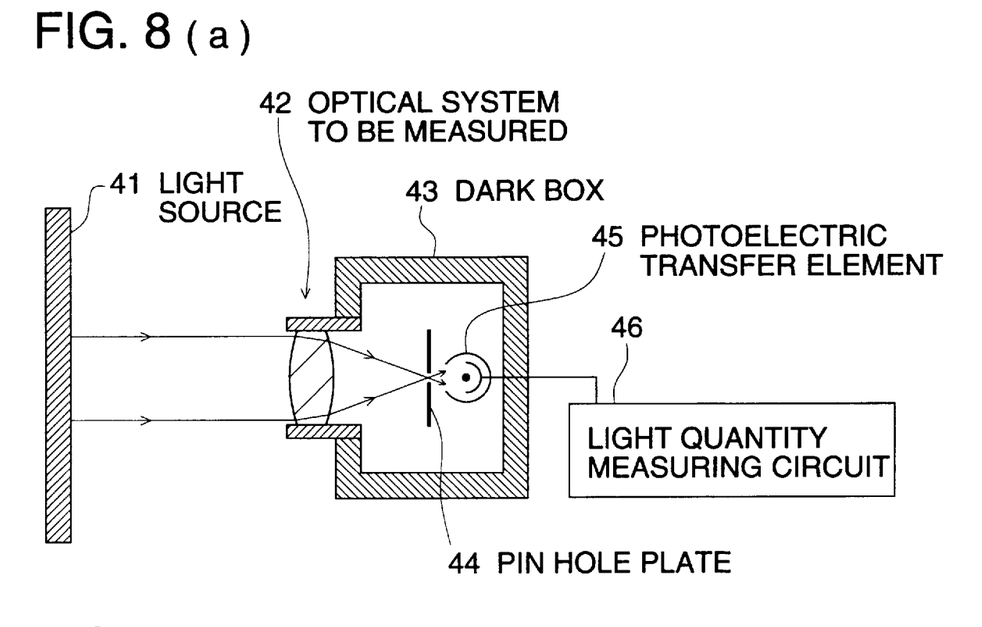
FIGS. 8(a) and 8(b) are structural diagrams showing the structure of a light quantity measuring instrument in measurement of a quantity of light in the embodiment of the invention.
Figure 8B:
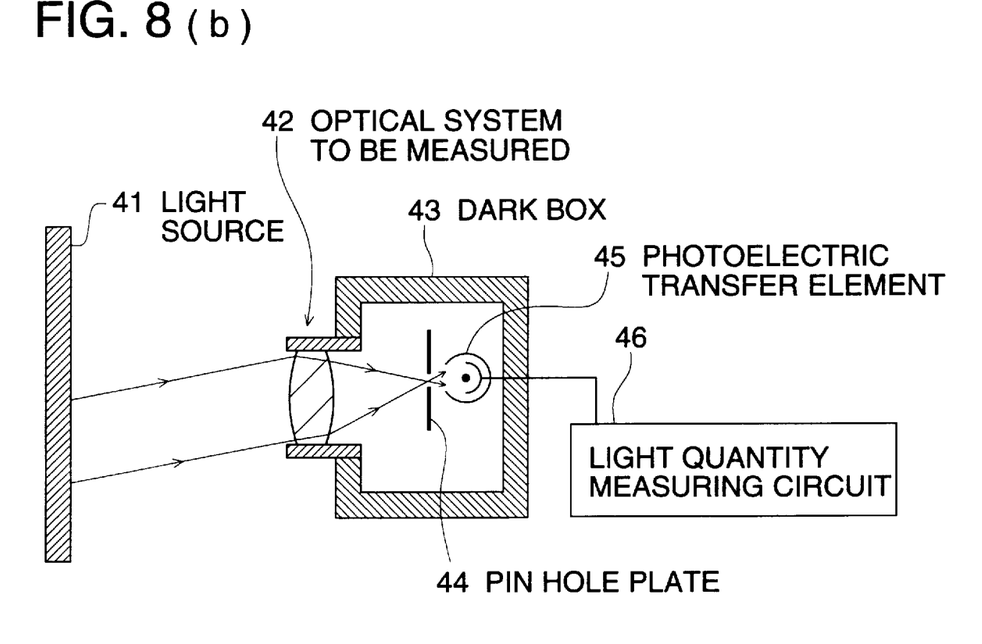

Incidentally, brightness measuring instrument 40 shown in FIGS. 8(a) and 8(b) can be used for measuring a quantity of light. Namely, optical system to be measured 42 is mounted on dark box 43, and movable pin hole plate 44 is provided at the position where a solid-state image pickup element is to be arranged (position of an image forming plane). Then, photoelectric transfer element 45 such as a photomultiplier which can move together with the pin hole plate 44 is provided behind the pin hole of the pin hole plate 44, and its output is supplied to brightness measuring circuit 46. Further, perfect diffusing surface light source 41 is arranged in front of the optical system to be measured 42. Incidentally, it is preferable that the pin hole plate 44 is thin so that eclipse may not be caused even when an incident light flux is tilted.

As shown in FIG. 8(a), quantity of light L1 at the central position is measured with a pin hole positioned at the center of a light-receiving surface of a solid-state image pickup element. Further, as shown in FIG. 8(b), quantity of light L2 at the peripheral position is measured with a pin hole positioned at the peripheral position of a light-receiving surface of a solid-state image pickup element (position being away from the center by 0.45 q).

Owing to the multiplier effect of (1) and (2) above, it is possible to solve, as stated above, the problem of the drop of brightness of the edge of image field which is a problem specific to an electronic still camera, whereby it is possible to realize an electronic still camera wherein brightness is uniform in an image plane.

EXAMPLE

A detailed verification will be made as follows, referring to examples and comparative examples.

Example 1

Figure 9:
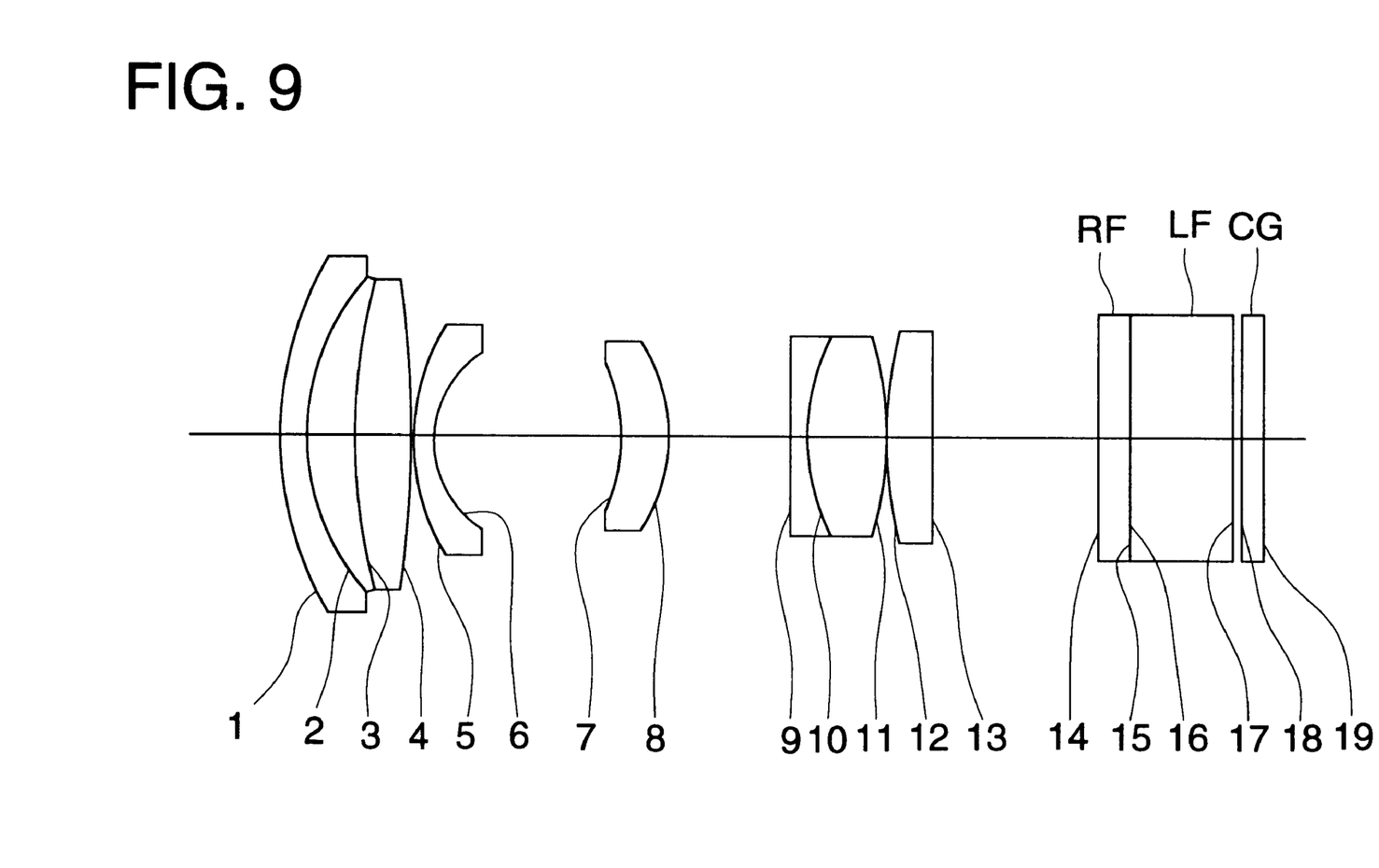
FIG. 9 is a sectional view of an optical system of an image pickup lens in Example 1 of the invention.

With regard to an image pickup lens in Example 1, a sectional view of an optical system is shown in FIG. 9. Optical data in Example 1 are shown in Table 2. Incidentally, an aperture-stop is assumed to be located at the position that is behind the 8th plane by 1.2 mm.

TABLE 2

| f = 6.035 | | F = 2.8 | | P = 0.0074 |
|---|---|---|---|---|
| Surface number | R | D | Nd | vd |
| 1 | 12.502 | 0.80 | 1.65844 | 50.9 |
| 2 | 7.757 | 1.50 | | |
| 3 | 23.343 | 1.70 | 1.80518 | 25.4 |
| 4 | −55.611 | 0.20 | | |
| 5 | 6.965 | 0.70 | 1.72000 | 50.2 |
| 6 | 3.436 | 6.06 | | |
| 7 | −5.912 | 1.50 | 1.58913 | 61.2 |
| 8 | −5.127 | 4.02 | | |
| 9 | 100.031 | 0.60 | 1.84666 | 23.8 |
| 10 | 6.788 | 2.60 | 1.77250 | 49.6 |
| 11 | −12.521 | 0.20 | | |
| 12 | 19.019 | 1.40 | 1.78590 | 44.2 |
| 13 | −89.125 | 5.31 | | |
| 14 | ∞ | 1.00 | 1.52000 | 65.0 | Infrared blocking filter |
| 15 | ∞ | 0.00 | | | |
| 16 | ∞ | 3.31 | 1.54880 | 67.0 | Cover glass serving as low-pass filter |
| 17 | ∞ | 0.20 | | | |

TABLE 2-continued

| f = 6.035 | | F = 2.8 | | P = 0.0074 |
|---|---|---|---|---|
| Surface number | R | D | Nd | vd |
| 18 | ∞ | 0.75 | 1.51633 | 64.1 | Cover glass |
| 19 | ∞ | | | | |

Lens performance of this image pickup lens will be shown below.

Resolving power (center)=160 lines/mm or more
Resolving power (periphery)=100 lines/mm or more
2×(1/(2P))=135 lines/mm
2.35×(1/(2P))=158.8 lines/mm
1.3×(1/(2P))=87.8 lines/mm Therefore, conditions for Embodiment 1–Embodiment 4 are satisfied.

$$h=3.4q$$

$$L1/L2=0.7$$

Therefore, conditions for Embodiment 5 are satisfied.

Example 2

Figure 10:
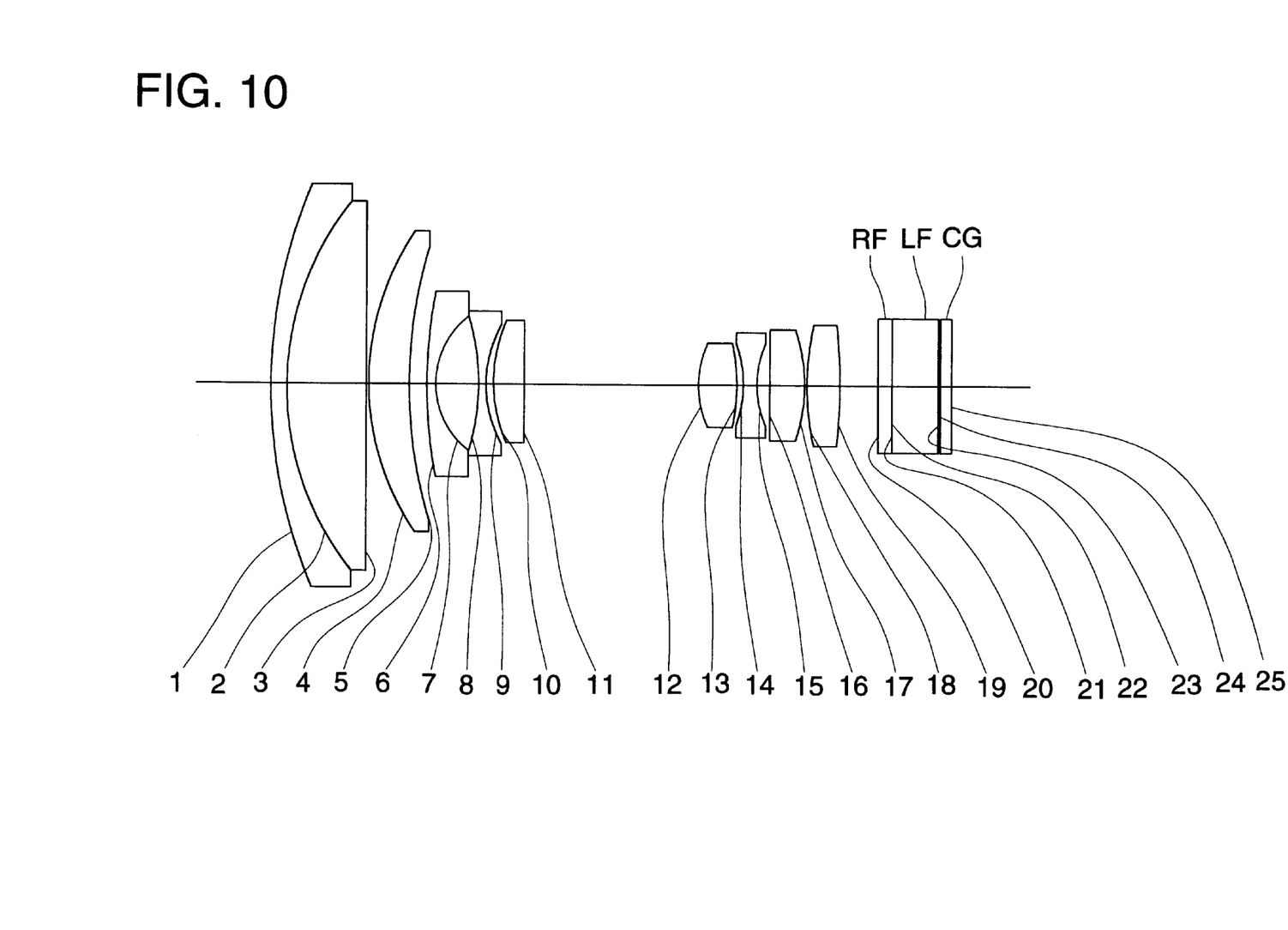
FIG. 10 is a sectional view of an optical system of an image pickup lens in Example 2 of the invention.

With regard to an image pickup lens in Example 2, a sectional view of an optical system is shown in FIG. 10. Optical data in Example 2 are shown in Table 3.

This image pickup lens is a zoom lens, and plural values are listed using D for variable spacing. In the present example, an aperture-stop is located at the position being away from the plane of the solid-state image pickup element by 26.4 mm between the 11th surface and the 12th surface, and it is invariable even in the case of varying magnification.

TABLE 3

| f = 6.19 − 10.41 − 17.55 | | F = 2.8 − 3.0 − 3.2 | | R = 0.0074 |
|---|---|---|---|---|
| Surface number | R | D | Nd | vd |
| 1 | 34.937 | 1.00 | 1.84666 | 23.8 |
| 2 | 19.888 | 5.30 | 1.71300 | 53.9 |
| 3 | 263.466 | 0.20 | | |
| 4 | 16.966 | 3.20 | 1.71300 | 53.9 |
| 5 | 38.991 | 1.00 − 4.67 − 7.90 | | |
| 6 | 31.294 | 0.60 | 1.77250 | 49.6 |
| 7 | 5.777 | 3.00 | | |
| 8 | −15.179 | 0.60 | 1.77250 | 49.6 |
| 9 | 8.285 | 0.50 | | |
| 10 | 9.358 | 2.20 | 1.84666 | 23.8 |
| 11 | −181.548 | 11.83 − 7.14 − 3.30 | | |
| 12 | 7.200 | 2.50 | 1.74400 | 44.8 |
| 13 | −17.914 | 0.50 | | |
| 14 | −9.575 | 1.00 | 1.80518 | 25.4 |
| 15 | 8.295 | 0.80 | | |
| 16 | 70.192 | 2.30 | 1.72916 | 54.7 |
| 17 | −11.000 | 0.20 | | |
| 18 | 16.017 | 2.60 | 1.72916 | 54.7 |
| 19 | −39.917 | 2.60 − 3.62 − 4.23 | | |
| 20 | ∞ | 1.00 | 1.52000 | 64.0 | Infrared blocking filter |
| 21 | ∞ | 0.00 | | | |
| 22 | ∞ | 3.31 | 1.54880 | 67.0 | Cover glass serving as low-pass filter |
| 23 | ∞ | 0.20 | | | |
| 24 | ∞ | 0.75 | 1.51633 | 64.1 | Cover glass |
| 25 | ∞ | | | | |

Lens performance of this image pickup lens will be shown below.

This image pickup lens is a zoom lens having the following performance in all variable magnifications.

Resolving power (center)=160 lines/mm or more
Resolving power (periphery)=100 lines/mm or more
2×(1/(2P))=135 lines/mm
2.35×(1/(2P))=158.8 lines/mm
1.3×(1/(2P))=87.8 lines/mm Therefore, conditions for Embodiment 1–Embodiment 4 are satisfied.

Further, the following is for the wide angle area, $h=8.58q$ $L1/L2=0.67$ and the following is for the tele-photo area.

$h=5.19q$ $L1/L2=0.85$

Therefore, conditions for Embodiment 5 are satisfied.

Comparative Example 1

Lens performance of an image pickup lens in comparative example 1 is shown below.

Resolving power (center)=150 lines/mm
Resolving power (periphery)=90 lines/mm
  2×(1/(2P))=167 lines/mm
  1.3×(1/(2P))=108 lines/mm
Therefore, all conditions for Embodiment 1–Embodiment 4 are not satisfied.
Further, the performance is as follows.

$h=3.53q$ $L1/L2=0.48$

Therefore, conditions for Embodiment 5 are not satisfied.

Comparative Example 2

Lens performance of an image pickup lens in comparative example 2 is shown below.

Resolving power (center)=120 lines/mm
Resolving power (periphery)=80 lines/mm
  2×(1/(2P))=135 lines/mm
  1.3×(1/(2P))=87.8 lines/mm
Therefore, all conditions for Embodiment 1–Embodiment 4 are not satisfied.
Further, the performance is as follows.

$h=2.40q$ $L1/L2=0.45$

Therefore, conditions for Embodiment 5 are not satisfied.

Image quality evaluation

Images obtained by electronic still cameras used in Examples 1 and 2 and Comparative examples 1 and 2 were evaluated.

In the evaluation method, an image obtained from each example was outputted to a video monitor having sufficient resolution to be evaluated.

As an image to be subjected to image pickup, a resolution chart located at the position 2 meters ahead of the image pickup lens, and a chart having black and white checkers located equally at the position 2 meters ahead of the image pickup lens were used.

Evaluation items of (1) sharpness and definition of the image, and (2) brightness uniformity, were used.

For the evaluation items mentioned above, 10 evaluators evaluated both images together. Evaluation results were ranked into three levels of A→excellent, B→slightly poor, and C→poor, and the number of evaluators for each evaluation level was obtained. Further, evaluation point A for the evaluation results which corresponds to overall evaluation was obtained by converting A to plus one point, B to zero point and C to minus one point.

Table 1 shows the number of evaluators for each evaluation level concerning sharpness and definition of an image and an evaluation point.

TABLE 1

| | Sharpness and definition | | | |
|---|---|---|---|---|
| | A | B | C | Evaluation point A |
| Example 1 | 8 | 2 | 0 | +8 |
| Example 2 | 8 | 2 | 0 | +8 |
| Comparative example 1 | 3 | 3 | 4 | −1 |
| Comparative example 2 | 2 | 5 | 3 | −1 |

TABLE 2

| | Uniformity of brightness in image plane | | | |
|---|---|---|---|---|
| | A | B | C | Evaluation point A |
| Example 1 | 8 | 2 | 0 | +8 |
| Example 2 | 8 | 2 | 0 | +8 |
| Comparative example 1 | 3 | 3 | 4 | −1 |
| Comparative example 2 | 2 | 3 | 5 | −3 |

As stated above, Examples 1 and 2 are better than Comparative examples 1 and 2 in terms of sharpness, definition and uniformity of brightness in an image plane.

Comparative example 1 is poor on the points of sharpness and definition, while Comparative example 2 is poor on the points of sharpness, definition and further uniformity of brightness in an image plane.

As stated in detail above, each invention herein offers the following effects.

(1) An electronic still camera of the invention makes it possible to obtain an image having sufficient sharpness and definition in the vicinity of the limiting resolving power even when an optical low-pass filter is used, because resolving power X of the image pickup lens at the center of a light-receiving surface of a solid-state image pickup element is set to be not less than twice the limiting resolving power (1/(2P)) determined by a pixel pitch of the solid-state image pickup element It is therefore possible to realize an electronic still camera which makes it possible to obtain an image having sufficient sharpness and definition even when an optical low-pass filter is used.

(2) In the electronic still camera of the invention, it is possible to obtain sufficient MTF in the vicinity of the limiting resolving power from the center to the periphery of the light-receiving surface even when an optical low-pass filter is used, because resolving power Y of the image pickup lens at the periphery (0.45 q from the center) of a light-receiving surface of a solid-state image pickup element is set to be not less than 1.3 times the limiting resolving power (1/(2P)) which is determined by the pixel pitch of the solid-state image pickup element.

It is therefore possible to realize an electronic still camera which makes it possible to obtain an image having sufficient sharpness and definition even when an optical low-pass filter is used.

(3) In the electronic still camera of the invention, a distance between the emergence pupil of the image pickup lens and the solid-state image pickup element is set so that it generates a prescribed ratio depending on the size of the solid-state image pickup element, and a quantity of light at the center and that at the periphery both of the light-receiving surface of the solid-state image pickup element are set to generate a prescribed ratio, sufficient light-receiving signals can be obtained even on the peripheral portion of the light-receiving surface.

It is therefore possible to realize an electronic still camera which makes it possible to obtain an image having sufficient sharpness and definition and having a less fall of brightness of the edge of image field and uniform brightness in an image plane.

What is claimed is:

1. An electronic still camera, comprising:

solid-state image pickup elements arranged such that a pixel pitch is P (mm);

an optical low-pass filter;

an image pickup lens for focusing the image light through the optical low-pass filter onto the solid-state image pickup elements, the image pickup lens having resolving power X (lines/mm) at an optical axis when the image light is focused on the solid-state image pickup elements;

wherein the following condition is satisfied:

$1/(F\lambda) > X > 1/P$ wherein F represents F-number and $\lambda$ is $550 \times 10^{-6}$ (mm).

2. The electronic still camera of claim 1, wherein when q represents a length of a diagonal line of a light-receiving surface of the solid-state image pickup elements and Y represents the resolving power of the image pickup lens at a position distant from the optical axis by 0.45q in a direction perpendicular to the optical axis, the following condition is satisfied:

$Y > 1.3/(2P)$.

3. The electronic still camera of claim 2, wherein when h represents a distance between emergence pupil of the image pickup lens and the solid-state image pickup elements on the optical axis, the following condition is satisfied:

$h > 2.5q$.

4. The electronic still camera of claim 3, wherein when L1 represents image illumination on the optical axis on the light receiving surface of the solid-state image pickup elements and L2 represents image illumination at a position distant from the optical axis by 0.45q in a direction perpendicular to the optical axis on the light receiving surface of the solid-state image pickup elements, the following condition is satisfied:

$L2 \geq 0.5L1$.

* * * * *